United States Patent
Pham (10) Patent No.: US 9,525,298 B1
(45) Date of Patent: Dec. 20, 2016

(54) METHOD AND SYSTEM FOR VOLTAGE BALANCING OF MULTIPLE RECHARGEABLE ENERGY STORAGE DEVICES

(71) Applicant: PMC-SIERRA US, INC., Sunnyvale, CA (US)

(72) Inventor: Tan Pham, San Jose, CA (US)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 206 days.

(21) Appl. No.: 14/525,967

(22) Filed: Oct. 28, 2014

(51) Int. Cl.
*H02J 7/00* (2006.01)

(52) U.S. Cl.
CPC .............. *H02J 7/0068* (2013.01); *H02J 7/007* (2013.01); *H02J 7/0029* (2013.01); *H02J 2007/0037* (2013.01)

(58) Field of Classification Search
CPC ..................................................... H02J 7/0068
USPC .......................................... 320/167, 118, 119
See application file for complete search history.

(56) References Cited

U.S. PATENT DOCUMENTS

| | | | | |
|---|---|---|---|---|
| 4,541,288 A * | 9/1985 | Kornrumpf | ................ | G01L 9/16 324/209 |
| 5,311,476 A * | 5/1994 | Kajimoto | .............. | G11C 11/406 331/186 |
| 5,428,268 A * | 6/1995 | Melis | ................. | H05B 41/2888 315/247 |
| 5,867,007 A * | 2/1999 | Kim | ....................... | H02J 7/0024 320/118 |
| 5,945,804 A * | 8/1999 | Hansson | ............... | H02J 7/0016 320/119 |
| 6,335,893 B1 * | 1/2002 | Tanaka | ................... | G11C 5/145 257/E27.097 |

(Continued)

FOREIGN PATENT DOCUMENTS

WO    2009112069    9/2009

OTHER PUBLICATIONS

Tecate PowerBurst Ultracapcitor type TPL data sheet, Apr. 15, 2014, http://www.tecategroup.com/capacitors/datasheets/powerburst/TPL.pdf, Tecate Group, San Diego, CA.

(Continued)

*Primary Examiner* — M'Baye Diao
(74) *Attorney, Agent, or Firm* — Letters Patent, LLC; Dennis R. Haszko (57) ABSTRACT

A system is provided for balancing voltage of two rechargeable energy storage devices connected in series at a common node. A voltage divider is configured to divide a total voltage across the two devices into first and second reference voltages. First and second circuit elements include, respectively: first and second comparators, first and second P-channel MOSFETs, first and second current limiting resistors, and first and second networks of resistors. The first circuit elements are in electrical communication and configured to actively discharge a first device of the two devices when a difference between a voltage at the common node and the first reference voltage is greater than a first predetermined voltage. The-second circuit elements are in electrical communication and configured to actively charge the first device when a difference between the voltage at the common node and the second reference voltage is less than a second predetermined voltage.

20 Claims, 3 Drawing Sheets

(56) References Cited

U.S. PATENT DOCUMENTS

| | | | | |
|---|---|---|---|---|
| 6,452,362 | B1* | 9/2002 | Choo | H02J 7/0013 320/116 |
| 6,750,631 | B2* | 6/2004 | Perelle | B60L 3/0046 320/112 |
| 6,806,686 | B1 | 10/2004 | Thrap | |
| 7,126,310 | B1* | 10/2006 | Barron | H02J 7/0016 320/108 |
| 7,274,170 | B2* | 9/2007 | Benckenstein, Jr. | H02J 7/0016 320/119 |
| 7,952,380 | B2* | 5/2011 | Broyde | H04B 3/30 326/21 |
| 7,994,756 | B2* | 8/2011 | Rowland | H02J 7/0016 320/118 |
| 8,154,250 | B2* | 4/2012 | Yu | H02J 7/0016 307/41 |
| 8,228,032 | B2* | 7/2012 | Bai | H02J 7/0016 320/118 |
| 8,288,993 | B2* | 10/2012 | Shiu | H02J 7/0016 320/116 |
| 8,525,478 | B2* | 9/2013 | Sutardja | H02J 7/0016 320/118 |
| 8,704,488 | B2* | 4/2014 | Yun | H02J 7/0016 320/116 |
| 2005/0269989 | A1* | 12/2005 | Geren | H02J 7/0016 320/119 |
| 2006/0194102 | A1* | 8/2006 | Keshishian | H01M 2/202 429/160 |
| 2009/0278496 | A1* | 11/2009 | Nakao | H02J 7/0016 320/118 |
| 2010/0283434 | A1 | 11/2010 | Kakiuchi | |
| 2013/0127419 | A1* | 5/2013 | Peter | H02J 7/0018 320/119 |

OTHER PUBLICATIONS

Cooper Bussmann PowerStor Supercapacitors HV series data sheet, © 2014 Bussmann, http://www.cooperindustries.com/content/dam/public/bussmann/Electronics/Resources/poduct-datasheets/Bus_Elx_DS_4376_HV_Series.pdf, Cooper Bussmann, Boca Raton, FL.

* cited by examiner

METHOD AND SYSTEM FOR VOLTAGE BALANCING OF MULTIPLE RECHARGEABLE ENERGY STORAGE DEVICES

FIELD OF THE INVENTION

The present disclosure generally relates to rechargeable energy storage devices. In particular, the present disclosure relates to a method and system for voltage balancing of multiple rechargeable energy storage devices that are connected in series.

BACKGROUND

Rechargeable energy storage devices are generally connected in series to provide voltage to a load. For example, when two rechargeable energy storage devices are connected in series and are charged from a single supply source, a voltage difference between the two rechargeable energy storage devices is mainly caused by: a difference in the capacitance between the two rechargeable energy storage devices; and an insignificant difference in their leakage currents. When a value of the difference in capacitance between the two rechargeable energy storage devices is large, the voltage across the rechargeable energy device with the smaller capacitance value may exceed its rated maximum allowable voltage, which eventually degrades the rechargeable energy storage device's operating time.

Two known methods exist for balancing voltages in rechargeable energy storage devices that are connected in series: passive balancing; and active balancing. In the passive balancing method, a resistor is placed in parallel with each rechargeable energy storage device that is connected in series. The resistance value of each resistor is the same and the resistance value is selected such that the current through the resistors (the bypass current) is much larger than the maximum leakage current of the rechargeable energy storage devices. In the passive balancing method, there is a trade-off between the time to balance the voltages in rechargeable energy storage devices (hereinafter referred to as the balancing time) and the resistor value which controls a bypass current through each rechargeable energy storage device. The balancing time may be reduced at the expense of an increase in the bypass current. When the bypass current is too high, the bypass current may be a burden to an energy source that is limited by the use of rechargeable energy storage devices having a small capacitance. When the bypass current is too low, the rechargeable energy storage devices may be exposed to overvoltage for an extended period of time, which shortens the useful life time of the rechargeable energy storage devices.

There are many known active balancing methods. Some active balancing methods utilize the limited source and sink currents that are inherent to the rechargeable energy storage devices to balance the voltage across each series connected rechargeable energy storage device. A drawback of these active balancing methods is that the limited currents increase the balancing time.

Other active balancing methods use higher current conduction devices in order to shorten the balancing time. However, to avoid oscillation on the output, these active balancing methods utilize a low pass filter, which slows down the response time and increases the balancing time.

Further active balancing methods utilize a microcontroller and software interface to read the voltage across each series connected rechargeable energy storage device before attempting to balance the voltages. A drawback of these active balancing methods is that these methods are generally slow, which results in some of the rechargeable energy storage devices being overcharged before voltage balancing is achieved.

Improvements to methods and systems for voltage balancing of multiple rechargeable energy storage devices that are stacked in series are therefore desirable.

BRIEF DESCRIPTION OF THE DRAWINGS

Embodiments of the present invention will be described, by way of example, with reference to the drawings and to the following description, in which.

DETAILED DESCRIPTION

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure generally relates to balancing voltages of a plurality of rechargeable energy storages devices (hereinafter referred to as energy storage devices) that are connected in series. Examples of rechargeable energy storage devices are super capacitors, ultra capacitors, lithium ion batteries, and lithium ion capacitors.

The present disclosure provides a voltage balancing system that balances voltage of a pair of adjacent energy storage devices of the plurality energy storages devices that are connected in series. The voltage balancing system is configured to maintain a voltage across each energy storage device in the pair below a maximum voltage during charging by an external power supply or during discharging to a load. The voltage balancing system includes first circuit elements and second circuit elements that provide charging and discharging paths to one of the energy storage devices in the pair when a voltage across the one device deviates from half the total voltage across the pair of adjacent energy storage devices by more than a predefined value.

The pre-defined value allows the voltage across each energy storage device of the pair of energy storage devices in the chain to vary within a range that is above or below half the total voltage across each pair before being balanced.

In an embodiment, the pre-defined range is determined by hysteresis voltage values set by feedback resistors that connect the outputs of the comparators of the voltage balancing system to one of their respective inputs. The hysteresis voltage values are a function of the maximum allowed voltage, the maximum rated voltage, and the noise voltage in the environment imposed on the voltage balancing system.

In another embodiment, the first circuit elements include a comparator, a transistor, and current limiting resistors that connect the output of the comparator to a node between the pair of energy storage devices to provide the charging path to one of the energy storage devices of the pair. Similarly, the second circuit elements also include a comparator, a transistor, and current limiting resistors that connect the output of the comparator to the node between the pair of energy storage devices to provide a discharging path to the one of the energy storage devices of the pair. The amplitude of the charging and discharging currents are limited by the selection of the transistors and the current limiting resistors.

In another embodiment, the voltage balancing system is configured to minimize a balancing time for each pair of energy storage devices in the chain of series-connected energy storage devices that have a large difference in capacitance by the selection of the transistors and the current limiting devices.

In an alternative embodiment, the voltage balancing system of the present disclosure includes an external controller that is configured to disable the first and second circuit elements of the voltage balancing system to facilitate accurate calculation of the capacitance of individual energy storage devices in the series connected chain.

In another embodiment, the voltage balancing system of the present disclosure may be disabled during discharging so that a load connected to the pair of energy storage devices may utilize any extra amount of charge that was deposited on the pair of energy storage devices during charging.

In a first aspect, the present disclosure seeks to provide a system for balancing voltage of first and second rechargeable energy storage devices that are connected in series at a common node. The system includes: a voltage divider for dividing a total voltage across the first and second rechargeable energy storage devices into a first reference voltage and a second reference voltage; first circuit elements comprising a first comparator, a first P-channel MOSFET, a first current limiting resistor, and a first network of resistors, the first circuit elements being in electrical communication and configured to actively discharge the first rechargeable energy storage device when a difference between a voltage at the common node and the first reference voltage is greater than a first predetermined voltage; and second circuit elements comprising a second comparator, a second P-channel MOSFET, a second current limiting resistor, and a second network of resistors, the second circuit elements being in electrical communication and configured to actively charge the first rechargeable energy storage device when a difference between the second reference voltage and the voltage at the common node and is greater than a second predetermined voltage.

In another aspect, the system further includes third circuit elements comprising a third P-channel MOSFET, a fourth P-channel MOSFET, a pull down resistor, a pull-up resistor, and a gate resistor, the third circuit elements being in electrical communication and configured to receive a control signal for enabling and disabling the first circuit elements and the second circuit elements.

In another aspect, the first network of resistors includes a three-resistor voltage divider, a feedback resistor, and an isolation resistor, and wherein the three-resistor voltage divider, the feedback resistor, the isolation resistor are in electrical communication and are configured to generate an upper bound hysteresis voltage when the first P-channel MOSFET turns on.

In another aspect, the first predetermined voltage is half the total voltage across the two rechargeable storage devices plus the upper bound hysteresis voltage.

In another aspect, the second resistor network comprises a pull up resistor, a feedback resistor, a pull down resistor, and an isolation resistor, and wherein the pull up resistor, the feedback resistor, the pull down resistor, and the isolation resistor are in electrical communication and are configured to generate a lower bound hysteresis voltage when the second P-channel MOSFET turns on.

In another aspect, the second predetermined voltage is half the total voltage across the two rechargeable storage devices minus the lower bound hysteresis voltage.

In another aspect, the first comparator comprises a first input for receiving the first reference voltage and a second input for receiving the voltage at the common node, and an open drain type output for driving a gate of the first P-channel MOSFET.

In another aspect, the first comparator is configured to turn on the first P-channel MOSFET to actively discharge the first rechargeable energy storage device when the voltage at the second input exceeds the voltage at the first input.

In another aspect, the second comparator comprises a first input for receiving the second reference voltage and a second input for receiving the voltage at the common node, and an open drain type output for driving a gate of the second P-channel MOSFET.

In another aspect, the first comparator is configured to turn on the second P-channel MOSFET to actively charge the first rechargeable energy storage device when the voltage at the second input is less than the first input.

In another aspect, the first current limiting resistor has a resistance value that limits that amount of current drawn by the first P-channel MOSFET during discharging of the first rechargeable energy storage device to a maximum rated drain current of the first P-channel MOSFET.

In another aspect, the second current limiting resistor has a resistance value that limits that amount of current drawn by the second P-channel MOSFET during charging of the first rechargeable energy storage device to a maximum rated drain current of second first P-channel MOSFET.

In another aspect, a drain current of the second P-channel MOSFET provides a charge rate that minimizes an amount of time the second rechargeable storage device is exposed on overvoltage.

In another aspect, the system further includes a controller electrically connected to a gate of the third P-channel MOSFET and a gate of the fourth P-channel MOSFET and configured to pull the voltage at the gate of the third P-channel MOSFET and the gate of the fourth P-channel MOSFET to a voltage of a negative terminal of the first rechargeable storage device to disable the first and second circuit elements.

In another aspect, the controller is configured to calculate the capacitance of each of the two rechargeable energy storage devices when the first and second circuit elements are disabled.

In another aspect, the present disclosure seeks to provide a system for balancing voltage of a voltage source, the voltage source including a first rechargeable energy storage device, a second rechargeable energy storage device, and a third rechargeable energy storage device connected in series. The first rechargeable energy device is connected to the second rechargeable energy storage device at a first common node, and the second rechargeable energy storage device is connected to the third rechargeable energy storage device at a second common node. The system includes a first voltage balancing system for balancing voltage of the first and second rechargeable energy storage devices and a second voltage balancing system for balancing voltage of the second and third rechargeable energy storage devices. The first voltage balancing system includes: a first voltage divider for dividing a total voltage across the first and second rechargeable energy storage devices that are connected at the first common node into a first reference voltage and a second reference voltage; first circuit elements comprising a first comparator, a first P-channel MOSFET, a first current limiting resistor, and a first network of resistors, the first circuit elements being in electrical communication and configured to actively discharge a first rechargeable energy storage device of the two rechargeable energy storage devices when a difference between a voltage at the common node and the first reference voltage is greater than a first predetermined voltage; and second circuit elements comprising a second comparator, a second P-channel MOSFET, a second current limiting resistor, and a second network of resistors, the second circuit elements being in electrical communication and configured to actively charge the first rechargeable energy storage device when a difference between the second reference voltage and the voltage at the common node and is greater than a second predetermined voltage. The second voltage balancing system includes: a second voltage divider for dividing a total voltage across the second and third rechargeable energy storage devices that are connected at the second common node into a third reference voltage and a fourth reference voltage; third circuit elements comprising a third comparator, a third P-channel MOSFET, a third current limiting resistor, and a third network of resistors, the third circuit elements being in electrical communication and configured to actively discharge the second rechargeable energy storage device when a difference between a voltage at the second common node and the third reference voltage is greater than a third predetermined voltage; and fourth circuit elements comprising a fourth comparator, a fourth P-channel MOSFET, a fourth current limiting resistor, and a fourth network of resistors, the fourth circuit elements being in electrical communication and configured to actively charge the second rechargeable energy storage device when a difference between the fourth reference voltage and the voltage at the second common node and is greater than a fourth predetermined voltage.

In another aspect, the first voltage balancing system further includes: fifth circuit elements comprising a fifth P-channel MOSFET, a sixth P-channel MOSFET, a first pull down resistor, a first pull-up resistor, and a first gate resistor. The fifth circuit elements are in electrical communication and configured to receive a control signal for enabling and disabling the first voltage balancing system.

In another aspect, the second voltage balancing system further includes: sixth circuit elements comprising a seventh P-channel MOSFET, an eighth P-channel MOSFET, a second pull down resistor, a second pull-up resistor, and a second gate resistor, the sixth circuit elements being in electrical communication and configured to receive the control signal for enabling and disabling the second voltage balancing system.

In another aspect, the arrangement further includes a controller electrically connected to a gate of the fifth P-channel MOSFET, a gate of the sixth P-channel MOSFET, a gate of the seventh P-channel MOSFET, a gate of the eighth P-channel MOSFET. The controller is configured to: pull the voltage at the gate of the fifth P-channel MOSFET and the gate of the sixth P-channel MOSFET to a voltage of a negative terminal of the first rechargeable energy storage device to disable the first and second circuit elements; and pull the voltage at the gate of the seventh P-channel MOSFET and the gate of the eighth P-channel MOSFET to a voltage of a negative terminal of the second rechargeable energy storage device to disable the third and fourth circuit elements.

In another aspect, the present disclosure seeks to provide a system for balancing voltage of a voltage source that includes a plurality n of series-connected rechargeable energy storage devices arranged in rechargeable energy storage device pairs such that each rechargeable energy storage device pair shares one rechargeable energy storage device with an adjacent rechargeable energy storage device pair, wherein n is a positive integer. The system includes a plurality n−1 of voltage balancing systems, each voltage balancing system configured to balance a voltage of a unique rechargeable energy storage device pair. Each voltage balancing system includes: first circuit elements comprising a first comparator, a first P-channel MOSFET, a first current limiting resistor, and a first network of resistors, the first circuit elements being in electrical communication and configured to actively discharge one of the two adjacent rechargeable energy storage devices when a difference between a voltage at a common node between the two adjacent rechargeable energy storage device and the first reference voltage is greater than a first predetermined voltage. Each voltage balancing system also includes: second circuit elements comprising a second comparator, a second P-channel MOSFET, a second current limiting resistor, and a second network of resistors, the second circuit elements being in electrical communication and configured to actively charge the one of the two adjacent rechargeable energy storage devices when a difference between the second reference voltage and the voltage at the common node and is greater than a second predetermined voltage.

Figure 1:
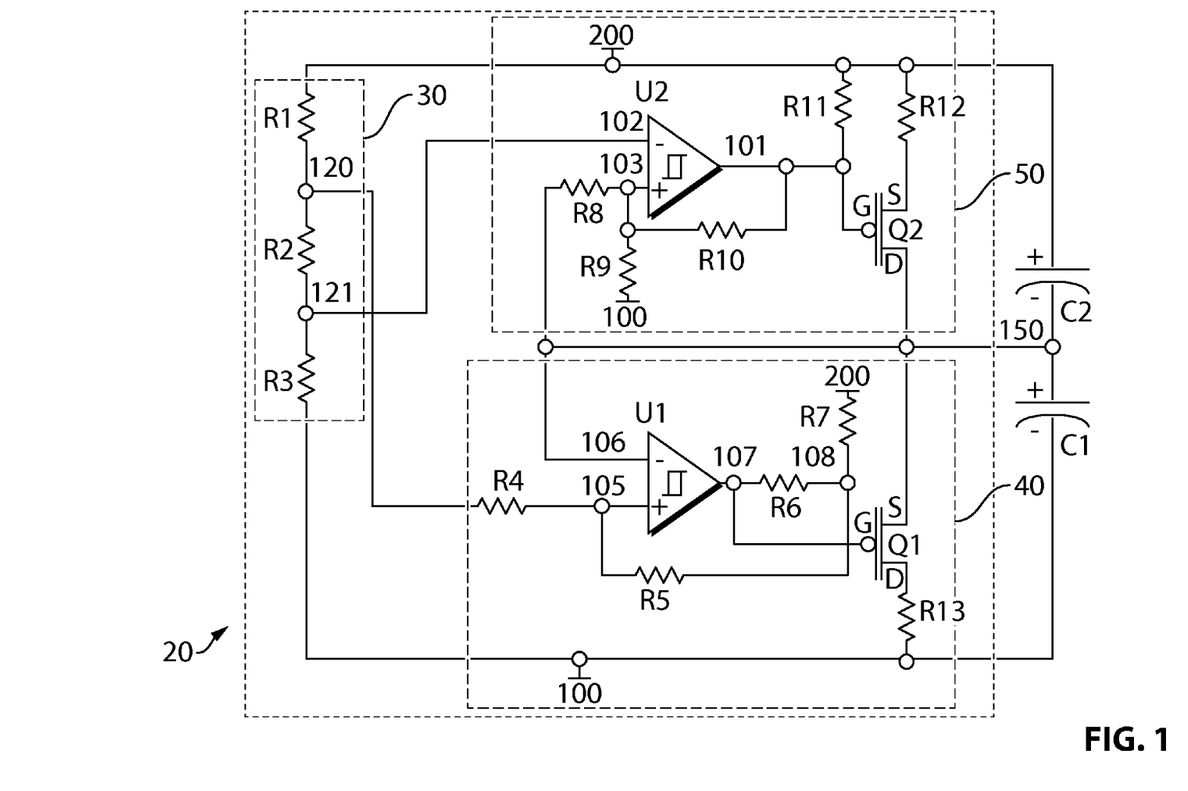
FIG. 1 is a circuit diagram of a voltage balancing system in accordance with an embodiment of the present disclosure.

Referring to FIG. 1, a circuit diagram of a voltage balancing system 20 in accordance with an embodiment of the present disclosure is shown. In the present embodiment, the rechargeable storage devices are capacitors and the voltage balancing system 20 is utilized to balance voltages across two capacitors C1, C2 that are connected in series. Each capacitor C1, C2 includes of a positive terminal (+) and a negative terminal (−). The negative terminal (−) of capacitor C2 is connected to the positive terminal (+) of capacitor C1 at a common node 150. The positive terminal (+) of capacitor C2 is connected to a node 200, which is also connected to the positive terminal (+) of an external power supply (not shown), such as a battery or charger. The negative terminal (−) of capacitor C1 is connected to a node 100, which is also connected to the negative terminal (−) of the external power supply. Optionally, the external power supply provides energy to the capacitors C1, C2, which store energy provided. The capacitors C1, C2 may also be connected to an external load (not shown), for example, a motor or an electronic load on a circuit board, to provide the stored energy in the capacitors C1, C2 to the external load.

The voltage $V_{n200}$, $V_{n150}$ on the positive terminal (+) of each capacitor C1, C2 is always greater than or equal to the voltage $V_{n150}$, $V_{n100}^-$ on the negative terminal of each capacitor C1, C2. The maximum allowable voltage on each capacitor C1, C2 is defined as the maximum allowable voltage difference between the positive (+) terminal and the negative terminal (−) of each capacitor C1, C2.

In the embodiment of FIG. 1, the negative terminal (−) of capacitor C1 is connected to the negative terminal (−) of an external power supply (not shown) at node 100. In an alternative embodiment, the negative terminal (−) of capacitor C1 may be connected to a positive terminal (+) of another capacitor (not shown) in a series connected chain of capacitors that includes more than two capacitors.

The voltage balancing system 20 is connected to the positive terminal (+) of capacitor C2 at a node 200, and to the negative terminal of the capacitor C1 at node 100. The voltage balancing system 20 is also connected to a node 150 that connects the negative terminal (−) of capacitor C2 to the positive terminal (+) of capacitor C1. The voltage balancing system 20 is powered by the voltage $V_{C1}$, $V_{C2}$ across capacitors C1 and C2. Current flows from the positive terminal (+) of capacitor C2, through the voltage balancing system 20, and returns to the negative terminal (−) of the capacitor C1. The voltage balancing system 20 monitors the voltages $V_{C1}$, $V_{C2}$ across capacitors C1, C2 through node 150 and removes any voltage difference between the two adjacent capacitors C1, C2, as described in further detail below.

The voltage balancing system 20 includes a voltage divider 30, first circuit elements 40, and second circuit elements 50. In the present embodiment, the voltage divider 30 is a three-resistor voltage divider that includes three resistors R1, R2, and R3. The three-resistor voltage divider 30 divides a total voltage ($V_{C1}+V_{C2}$) across capacitors C1 and C2 (i.e., the voltage difference between nodes 200 and 100) into a first reference voltage $V_{n120}$ at node 120 and a second reference voltage $V_{n121}$ at node 121. The resistance values of the three resistors R1, R2, R3 are selected such that the resistance value of R1 is the sum of the resistance values of R2 and R3.

The first circuit elements 40 include a comparator U1, a p-channel MOSFET Q1, a first network of resistors R4, R5, R6, and R7, and a current limiting resistor R13. The comparator U1 includes a non-inverting input 105, an inverting input 106, and an output 107. The non-inverting input 105 is connected through an isolation resistor R4 to node 120 of the voltage divider 40. The inverting input 106 of comparator U1 is directly connected to node 150.

The output 107 of comparator U1 is controlled by a voltage difference on the inverting input 106 and the non-inverting input 105. When the voltage $V_{n105}$ on the non-inverting input 105 is greater than the voltage $V_{n106}$ on the inverting input 106, the output 107 of the comparator U1 is pulled to the voltage of the positive terminal of the capacitor C2 through node 200. This voltage is defined as "high". When the voltage $V_{n105}$ on the non-inverted input 105 is less than the voltage $V_{n106-}$ on the inverted input 106, the output 107 of the comparator U1 is pulled to the voltage of the negative terminal of the capacitor C1 through node 100. This voltage is defined as "low".

The second circuit elements 50 include a comparator U2, a p-channel MOSFET Q2, a network of resistors R8, R9, R10, and R11, and a current limiting resistor R12. The comparator U2 includes an inverting input 102, a non-inverting input 103, and an output 101. The output 101 of comparator U2 is controlled by a voltage difference on the inverting input 102 and the non-inverting input 103. When the voltage $V_{n103}$ on the non-inverting input 103 is greater than the voltage $V_{n102-}$ on the inverting input 102, the output 101 of the comparator U2 is pulled to the voltage of the positive terminal of the capacitor C2 through node 200. This voltage is defined as "high". When the voltage $V_{n103}$ on the non-inverting input 103 is less than the voltage on the $V_{n102-}$ inverting input 102, the output 101 of the comparator U2 is pulled to the voltage of the negative terminal of the capacitor C1 through node 100. This voltage is defined as "low".

The outputs 101, 107 of the comparators U2 and U1, respectively, are of open-drain or open collector type. The output 107 of comparator U1 is connected to node 200 through a resistor R6 that is connected in series with a pull-up resistor R7. The output 101 of the comparator U2 is connected to node 200 through a pull-up resistor R11. The pull-up resistors R7, R11 are provided so that the outputs 107, 101 of the comparators U1, U2 can be pulled high to the same voltage as the positive terminal (+) of capacitor C2.

The voltage $V_{C1}$ across capacitor C1 is monitored by comparator U1 via the inverting input 106, which is directly connected to the positive terminal (+) of capacitor C1 at node 150. The voltage $V_{n105}$ at the non-inverting input 105 of the comparator U1 is exactly half of the voltage $V_{n200}$ at node 200 when the voltage $V_{n150}$ at node 150 is greater than the reference first voltage $V_{n120}$ at node 120. When the voltage $V_{n150}$ at node 150 is less than the reference voltage $V_{n120}$ at node 120, the voltage $V_{n105}$ at the non-inverting input 105 of the comparator U1 is equal to the sum of the first reference voltage $V_{n120}$ at node 120 and a hysteresis voltage that is set by the resistors R4, R5, R6 and R7 of the first network of resistors.

When the capacitance of capacitor C2 is greater than the capacitance of capacitor C1 and the capacitors C1, C2 are charged without voltage balancing, the voltage across capacitor C1 is always higher than the voltage across capacitor C2. When the capacitance difference between those two capacitors C1, C2 is large, the capacitor with a smaller capacitance value is charged with voltage beyond the maximum rated voltage allowed on that capacitor.

When the voltage across capacitor C1 increases above the first reference voltage $V_{n120}$ at node 120, the output 107 of comparator U1 is driven low and the transistor Q1 is turned on, which causes capacitor C1 to discharge through the current limiting resistor R13 until the voltage across capacitor C1 is equal to the voltage at node 120. While the output 107 is low, voltage at node 120 and the voltage at non-inverting input 105 are the same.

The output 107 of the comparator U1 is pulled high as soon as the voltage across capacitor C1 (which is also the voltage at the corresponding inverting input 106) falls below the voltage at the non-inverting input 105, which turns off the transistor Q1. When the transistor Q1 is turned off, the capacitor C1 stops discharging, and the voltage across capacitor C1 is maintained the same as the voltage across capacitor C2.

When the output 107 of the comparator U1 is high, a small amount of current flows through the pull up resistor R7, the feedback resistor R5, and the isolation resistor R4, the voltage at the non-inverting input 105 is raised to a small amount above the voltage at the inverting input 106. The small amount of voltage difference is the hysteresis voltage that is added to non-inverting input 105 so as to further inhibit oscillation on the output 107 due to slow changes in voltage at the non-inverting input 105 and the inverting input 106 of the comparator U1 while the capacitor C1 is being charged or discharged. This is especially important when the voltages at the non-inverting input 105 and the non-inverting input 106 are nearly equal. As long as the voltage $V_{n150}$ at node 150 is greater than the voltage $V_{n121}$ at reference node 121, the output 101 of comparator U2 remains high and no current flows through transistor Q2.

The comparator U2 compares the second reference voltage $V_{n121}$ at node 121 via its inverting input 102 and the voltage $V_{C1}$ across capacitor C1 at node 150 via its non-inverting input 103 through an isolation resistor R8. The output 101 of comparator U2 is driven high when the voltage $V_{n103}$ at its corresponding non-inverting input 103 is higher than the voltage at its inverting input 102

The second reference voltage $V_{n121}$ at node 121 from the three-resistor voltage divider 30 is always less than the reference voltage $V_{n120}$ at node 120 due to some resistance on resistor R2. Thus, when the voltage $V_{C1}$ across capacitor C1 is equal to the voltage $V_{C2}$ across capacitor C2, there is a voltage difference between the non-inverting input 103 and the inverting input 102. This voltage difference is the hysteresis voltage set by the pull up resistor R11, the feedback resistor R10, the pull down resistor R9, and the isolation resistor R8.

When the capacitance value of capacitor C1 is higher than the capacitance value of capacitor C2 and the capacitors C1, C2 are being charged without the voltage balancing circuit being connected to the capacitors C1, C2, the voltage $V_{C2}$ across capacitor C2 is always higher than the voltage $V_{C1}$ across capacitor C1. In fact, the voltage $V_{C2}$ across capacitor C2 may be overcharged before the total voltage across the two capacitors C1, C2 reaches a pre-determined voltage. When the voltage balancing system 20 of the present disclosure is connected to the capacitors C1, C2, the voltages between the two capacitors C1, C2 are balanced by providing an additional current path to capacitor C1 through transistor Q2 via current limiting resistor R12. This charging current provides additional charge to capacitor C1 until the voltage $V_{C1}$ across capacitor C1 equals to the voltage $V_{C2}$ across C2. When the voltage $V_{C1}$ across capacitor C1 is equal to the voltage $V_{C2}$ across C2, the transistor Q2 stops conducting.

Transistor Q2 is turned on when its gate voltage is less than its source voltage by a threshold voltage which is defined by the transistor in use. This gate is connected to the output 101 of comparator U2. The output 101 is pulled low when the voltage $V_{n102}$ at the inverting input 102 is greater than the voltage $V_{n103}$ at the non-inverting input 103. The inverting input 102 is connected to node 121 of the three resistor voltage divider 30, and the non-inverting input 103 is connected to node 150 via isolation resistor R8.

While capacitor C1 is charging with an additional current through transistor Q2, the output 107 of comparator U1 is driven high because the voltage $V_{n105}$ at the non-inverting input 105 is greater than the voltage $V_{n106-}$ at the inverting input 106. Driving the output 107 high turns off transistor Q1, which in turn inhibits capacitor C1 from discharging.

Transistor Q2 stops charging capacitor C1 when the corresponding voltage $V_{n103}$ at the non-inverting input 103 of comparator U2 increases to a voltage that is equal to the voltage $V_{n102}$ at inverting input 102. The resistance values of resistors R8, R9, R10 and R11 are selected such that when the voltages at the inverting input 102 and the non-inverting input 103 are equal and the output 101 is low, the voltages across C1 and C2 are equal.

The output 101 starts going high when the voltage $V_{n103}$ at the non-inverting input 103 becomes greater than the voltage $V_{n102}$ at the inverting input 102, resulting in an additional amount of voltage being added to the non-inverting input 103. The net voltage $V_{n103-}$ at the non-inverting input 103 is now the same as the voltage across C1 due to the feedback resistor R10 that is now pulled high by the pull up resistor R11. The voltage $V_{n103}$ at the non-inverting input 103 is also equal to the voltage across C2.

The jump in voltage at the non-inverting input 103 when its corresponding output 101 goes high is the hysteresis voltage that is added to the voltage difference between the non-inverting input 103 and the inverting input 102 so as to further inhibit the voltage at the output 101 from oscillating.

When the voltage $V_{C1}$ across C1 equals the voltage $V_{C2}$ across C2, the voltage $V_{n101}$, $V_{n107}$ at the respective outputs 101 and 107 of comparators U1 and U2 will both be high, inhibiting capacitor C1 from being charged or discharged. The balanced voltage between the capacitors C1 and C2 is maintained until an external load (not shown) is applied to draw the energy that is stored in capacitors C1 and C2. The power consumed by the comparators U1 and U2 is substantially less than the power consumed by the load when the outputs 101 and 107 are high, and the voltage balancing system 20 is operating in an idle mode.

The voltage balancing system 20 is enabled when either output 101 of comparator U2 is low, or output 107 of comparator U1 is low. When the output 107 of comparator U1 is low, transistor Q1 is turned on and capacitor C1 is discharged. Similarly, when the output 101 of comparator U2 is low, transistor Q2 is turned on and capacitor C1 is charged.

The voltage balancing system 20 is also enabled when a value of the difference between the voltage $V_{C1}$ across capacitor C1 and the voltage $V_{C2}$ across capacitor C2 is greater than a hysteresis voltage value set by resistors R4, R5 and R7 (the upper-bound voltage value). The voltage balancing system 20 is also active when a value of the difference between the voltage $V_{C2}$ across capacitor C2 and the voltage $V_{C1}$ across capacitor C1 is greater than a hysteresis voltage value set by resistors R8, R9 and R10 and R11 (the lower-bound voltage value). The upper and lower bound hysteresis voltages, when respectively added or subtracted from the balanced voltage, define a voltage band which the capacitors C1, C2 can tolerate before being voltage balanced.

The voltage balancing system 20 is disabled during charging or discharging when the capacitance of capacitors C1 and C2 is equal or the difference in capacitance is within a range such that the resulting voltage $V_{C1}$, $V_{C2}$ across each capacitor C1, C2 is always within a voltage band. The voltage band has a maximum voltage equal to half the total voltage across the capacitors plus upper-bound hysteresis voltage and a minimum voltage equal to half the total voltage across the capacitors C1, C2 minus the lower-bound hysteresis voltage.

Figure 2:
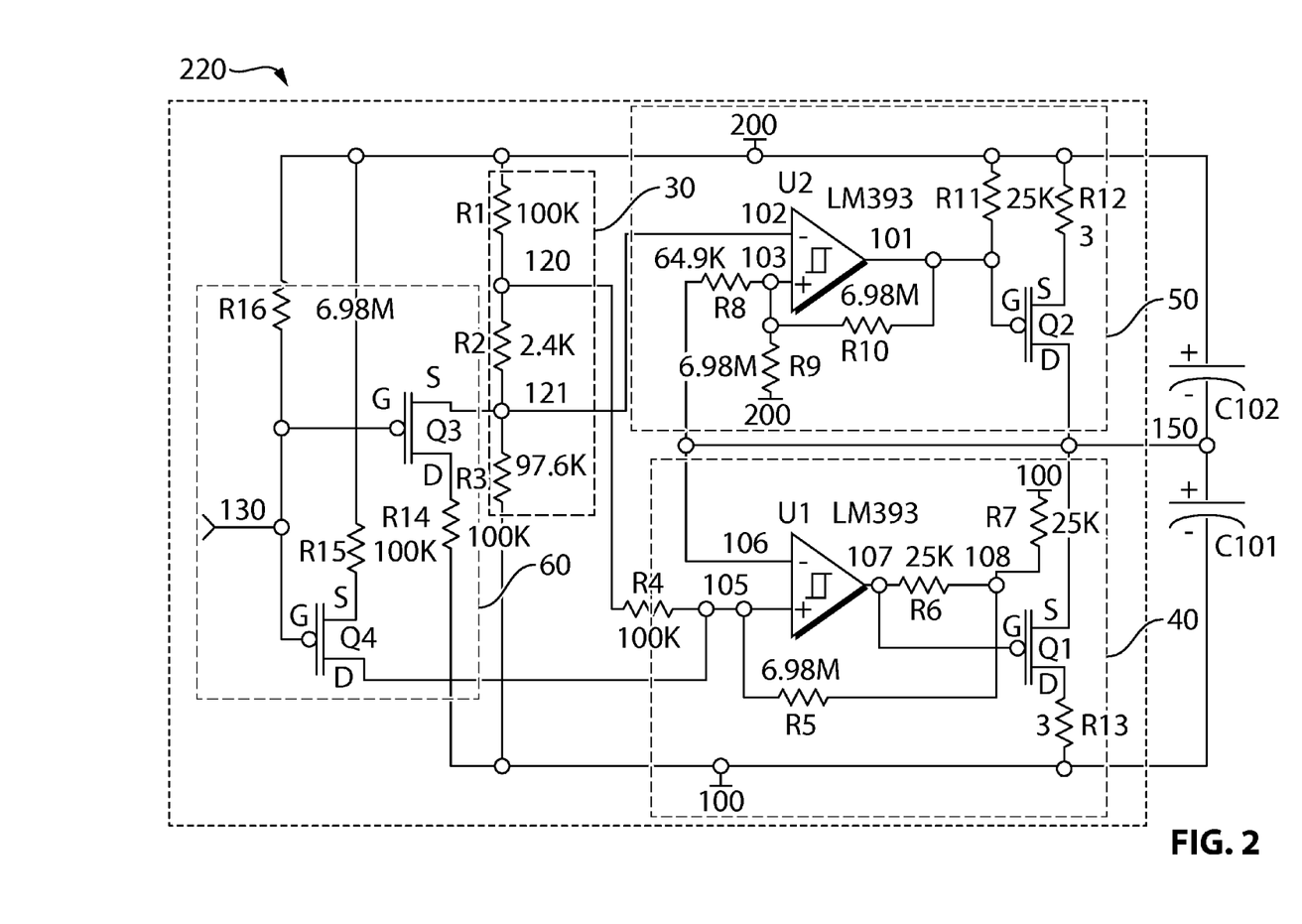
FIG. 2 is a circuit diagram of a voltage balancing circuit in accordance with another embodiment of the present disclosure.

Referring to FIG. 2, a voltage balancing system 220 in accordance with another embodiment of the present disclosure is shown. In the present embodiment, the rechargeable storage devices are super capacitors, and the voltage balancing system 220 is utilized to balance voltages across two super capacitors C101, C102 that are connected in series. The voltage balancing system 220 shown in FIG. 2 is similar to the voltage balancing system 20 shown in FIG. 1 and includes third circuit elements 60 that are configured to disable the voltage balancing system 220 from balancing voltage during a capacitance learning cycle and/or during a discharging process. The third circuit elements 60 include two P-channel MOSFETs Q3, Q4 and two resistors R14, R15.

The drain D of transistor Q3 is connected to node 100 through resistor R14 and the source S of transistor Q3 is connected to node 121. Node 121 is also connected to the inverting input 102 of comparator U2. The drain D of transistor Q4 is connected to the non-inverting input 105 of comparator U1 and the source S of transistor Q4 is connected to node 200 through resistor R15. The gates G of transistors Q3 and Q4 are connected together at node 130 and are pulled up to node 200 through resistor R16.

In an embodiment, an external agent (not shown) is provided and configured to stop the voltage balancing system 220 from balancing the voltages across capacitors C101, C102 by pulling node 130 low to the same voltage as node 100, turning both transistors Q3 and Q4 on. This drives the voltage $V_{n105}$ at the non-inverting 105 of comparator U1 higher than the voltage $V_{n150}$ at node 150 and the voltage $V_{n102}$ at the inverting input 102 of comparator U2 smaller than the voltage $V_{n150}$ at node 150. The outputs 107 and 102 of comparators U1 and U2 are then pulled high, which turns off transistors Q1 and Q2. Turning off transistors Q1 and Q2 disables the charging or discharging of capacitor C101.

When node 130 is left open, the voltage balancing system 220 is enabled and the first and second circuit elements 40, 50 of the voltage balancing system 220 resume balancing the voltage between capacitors C101, C102.

In an embodiment, a capacitance learning cycle is used occasionally or periodically to find the current capacitance value of the capacitors C101, C102 so as to determine any deviation from the nominal value of the capacitors C101, C102. The capacitance value of capacitors C101, C102 may deviate from their nominal value due to, for example, effects from the manufacturing process, or the effects of voltages and temperatures over time.

The capacitance learning cycle involves discharging the capacitors C101, C102 through a known, constant current for a short period of time so as to determine a difference in the voltages of the capacitors C101, C102 at the beginning and end of the time period. The voltage balancing system 220 should not interfere with this procedure in order for the voltage across each capacitor to be read correctly. The capacitance learning process is not part of this present invention, and thus will not be discussed further.

When an external load (not shown) is connected to the capacitors C101, C102, current is drawn from the capacitors C101, C102. When the voltage balancing system 220 is enabled, an excess amount of charge is either deposited on or removed from capacitor C101 through the current limiting resistors R12 and R13, respectively, and the voltage between the two capacitors C101 and C102 remains balanced. The current drawn from capacitors C101, C102 flows through the resistors R12 and R13 and energy is released from the resistors R12, R13 as heat.

Thus, for the case of series connected capacitors in a pair with different capacitance, during discharging with voltage balancing system enabled, the amount of charge that was deposited in the capacitor with a larger capacitance value in the previous charging process for voltage balancing will be conserved to provide more energy to the load.

The operation of the voltage balancing system 220 of FIG. 2 will now be described in detail. As mentioned above, the voltage balancing circuit 220 is utilized to balance the voltage across two adjacent super capacitors C101, C102 in a chain that includes n super capacitors connected in series. There is one voltage balancing system for every two adjacent series connected super capacitors in the chain, and thus, there are n voltage balancing systems for n+1 super capacitors.

In this embodiment shown in FIG. 2, the super capacitors C101, 102 have a maximum rating voltage of 2.7V. However, to maximize the operating life of the capacitors C101, C102, only a typical voltage of 2.5V across any capacitor in the chain is allowed. Thus, the total voltage across all capacitors in series is n*2.5V which is provided by an external power supply or by a battery (not shown).

The comparators U1, U2 in this example are the LM393 device that is manufactured by Texas Instruments, STMicroelectronics, and Fairchild Semiconductors. The LM393 device includes of two independent comparators with open-collector outputs in a dual package; the voltage supply to this device is ranged from 2V to 36V.

Due to manufacturing process and the effects of temperatures and voltages over time, the capacitance of the super capacitors used in this example may vary within plus and minus 30% of their nominal values in addition to the tolerance of −10/+20% of their initial rated values during their operating life. Such a large difference in capacitance of series connected super capacitors when being charged or discharged will expose them to overvoltage. Thus, in order to inhibit the capacitors being overcharged, the voltage balancing system includes first and second circuit elements 40, 50 that provide high current paths for discharging and charging capacitor C101. The first and second circuit elements 40, 50 include two P-channel MOSFET transistors Q1 and Q2, respectively, with a minimum of 3 A drain current and their associated current limiting resistors R12 and R13 with a resistance value of 3 ohm in this example so as to significantly reduce the balancing time for the voltages across capacitors C101 and C102.

When each of the super capacitors C101, 102 is charged to their typical voltage value of 2.5V, the voltage balancing system 220 is disabled, and the current consumed by the comparators U1 and U2 is substantially reduced. The voltage balancing system 220 of the present disclosure is only enabled when the voltage across each pair of capacitors C101, C102 is either higher than half of the total voltage across the pair plus an upper hysteresis voltage, or lower than half the total voltage across the pair minus the lower hysteresis voltage. In the example embodiment shown in FIG. 2, the upper hysteresis voltage and lower hysteresis voltage are both set to 50 mV when all the capacitors are charged to 2.5V.

The upper limit of hysteresis voltage may be set to any values based on equation (1), $$H_{upper} \equiv V_p - \frac{V_{SC}}{2} = \left(\frac{3R_1}{6R_1 + 4R_{fb}}\right)V_{SC} \quad (1)$$

where $V_{sc}$ is the total voltage across both super capacitors C102 and C101 (which is the voltage difference between nodes 200 and 100), and $V_p$ is the voltage at non-inverting input 105 of comparator U1 (which is also the voltage at reference node 121). $R_{fb}$ is defined as $$R_{fb} = R_5 + R_7 \quad (2)$$

The lower limit of hysteresis voltage value may be found from $$H_{lower} \equiv \frac{V_{SC}}{2} - V_b = \left[\frac{1}{2} - \frac{R_3}{R_1}\left(\frac{2R_1 + R_{fb}}{3R_1 + 2R_{fb}}\right)\right]V_{SC} \quad (3)$$

where $V_b$ is the voltage at inverting input 102 of comparator U2, R2 and R3 are in the three-resistor voltage divider 30 and are related to R1 by:

$$R_2 = R_1 - R_3 \quad (4)$$

The isolation resistor R8 is found in equation (5) below to satisfy the condition that the voltage at non-inverting input 103 is equal to the voltage at inverting input 102 when the voltage across super capacitor C101 equals the voltage across super capacitor C102:

$$R_8 = \left(\frac{V_{SC}}{2V_b} - 1\right)\frac{R_{fb}}{2} \qquad (5)$$

Figure 3:
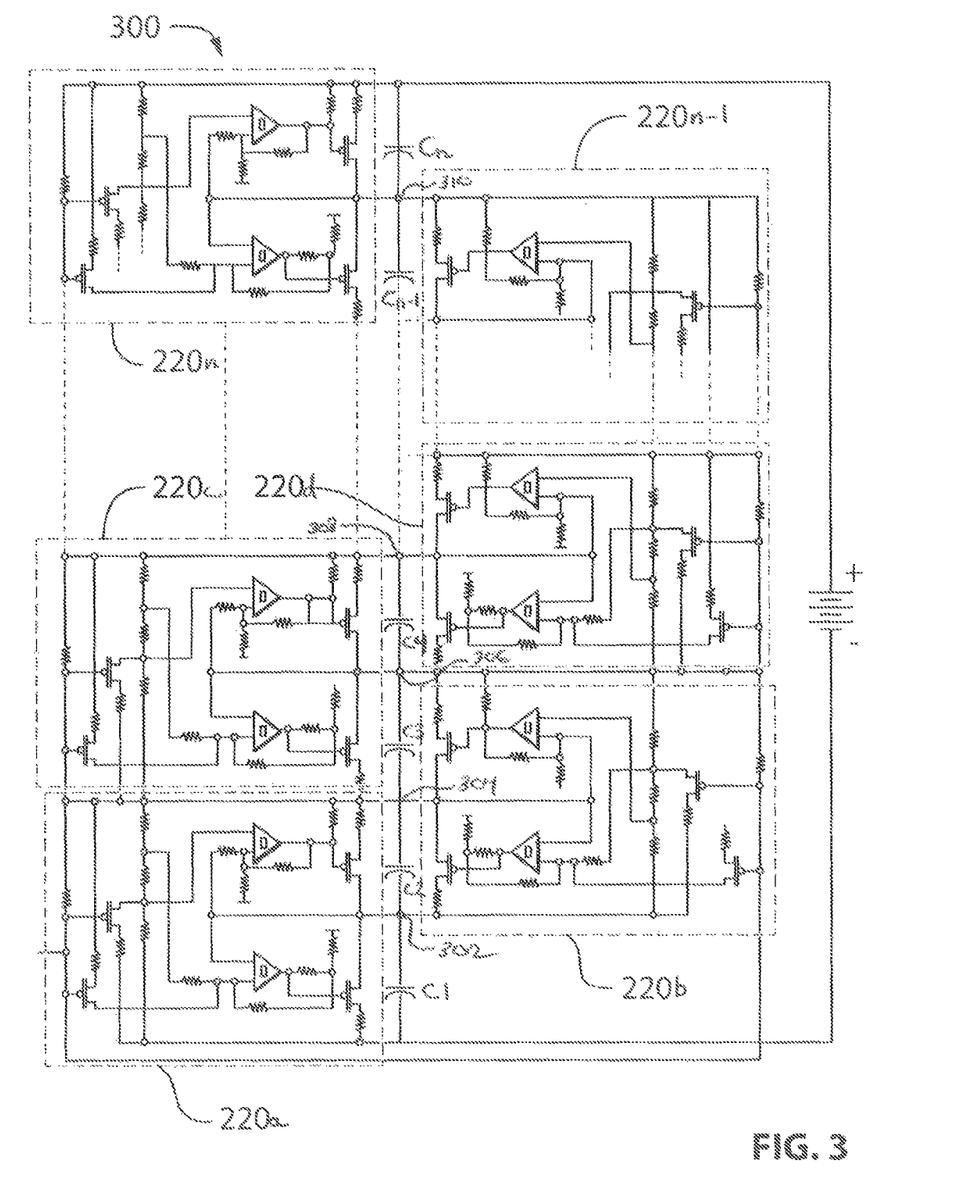
FIG. 3 is a circuit diagram of an arrangement of n energy storage devices connected in series along with n−1 voltage balancing systems of FIG. 2.

Equations (1) and (2) are derived under conditions that the effects of leakage current to and from the comparators in FIG. 3 are neglected. The resistors R1 and R4 have the same resistance value. Similarly, resistors R5, R9 and R10 have the same resistance value.

In the example embodiment shown in FIG. 2, the resistance values of R1 and R4 are set to 100 Kohm, the resistance value of R2 is set to 2.4 Kohm, the resistance value of R3 is set to 97.6K, the resistance values of R5, R9 and R10 are set to 6.98 Mohm, the resistance values of R6, R7 and R11 are set to 25 Kohm, and the resistance value of R8 is set to 64.9 Kohm. The upper hysteresis voltage value is 50 mV and the lower hysteresis voltage value is 45 mV when both super capacitors C101 and C102 are fully charged and the total voltage across the super capacitors C101, C102 is equal to 5V. Preferably, the resistors R1 through R16 have a tolerance of 1% to increase the accuracy to the voltage settings.

The resistance values of the resistors are not limited by this example. Any combination of resistance values of these resistors may also be used as long equations (1) to (5) are satisfied with a pre-determined hysteresis voltage value.

During charging, the voltage balancing system 220 is idle when the capacitance values of both super capacitors C101 and C102 are equal, or when the difference in the capacitance value between the two super capacitors C101, C102 is within the range that the resulting voltage across each of them is below the upper-bound hysteresis value or above the lower-bound hysteresis value. In the present example, the upper-bound voltage values is set to 2.55V and the lower-bound hysteresis voltage is set to 2.45V when the total voltage across both super capacitors C101, C102 is 5V While waiting for external load (not shown) to draw energy from the super capacitors C101, C102, the voltage balancing system 220 is only active when the voltage across either super capacitor is higher than 2.55V or less than 2.45V. This change in voltage is due to the difference in internal leakage current of each super capacitor C101, C102, and to a small amount of current that flows through resistors R8 and R9. The voltage balancing system 200 is enabled to equalize the voltage across each capacitor in the pair to the value of 2.5V. The internal leakage current in the super capacitors C101, C102 is in the range of micro amps, whereas the current flowing through resistors R8 and R9 is in the nano ampere range.

The voltage balancing system 220 may be disabled by the third circuit elements 60 that include two low-power P-channel MOSFET Q3 and Q4 together with resistors R14 and R15 that have the same resistance value of 100 Kohm.

The gates of transistors Q3 and Q4 are connected together at node 130 in FIG. 2, and are pulled up to node 200 via resistor R16 with a value of 6.98 Mohm. These gates, when pulled to the voltage at node 100 by, for example, a controller (not shown), disable the first and second circuit elements 40, 50. In the embodiments described above and shown in FIG. 1 and FIG. 2, respectively, the voltage source includes two rechargeable energy storage devices connected in series and the voltage balancing system 20, 220 is utilized to balance voltage across the two rechargeable energy storage devices that are connected in series.

In an alternative embodiment, the present disclosure provide a system for balancing voltage of a voltage source that includes n rechargeable energy storage devices connected in series, where n is a positive integer. The n series-connected energy storage devices are required for applications that need to operate with higher voltage, which is equal to the number of energy storage devices, n, multiplied by the balanced voltage across each rechargeable energy storage device. The n rechargeable energy storage devices are arranged in rechargeable energy storage device pairs such that each rechargeable energy storage device pair shares one rechargeable energy storage device with an adjacent rechargeable energy storage device pair. A voltage balancing system is utilized to balance the voltage of each unique rechargeable energy storage device pair.

FIG. 3 shows an example embodiment of a system 300 for balancing voltage of a voltage source that includes n rechargeable energy storage devices connected in series. In the example embodiment shown in FIG. 3, a first rechargeable energy device C1 is connected to an adjacent second rechargeable energy device C2 at a first common node 302, the second rechargeable energy device C2 is connected to an adjacent third rechargeable energy device C3 at a second common node 304, the third rechargeable energy device C3 is connected to an adjacent fourth rechargeable energy device C4 at a third common node 306, the fourth rechargeable energy device C4 is connected to an adjacent fifth rechargeable energy device (not shown) at a fourth common node 308, and so on. In the system 300, the Cn−1 rechargeable energy storage device is connected to an adjacent $n^{th}$ rechargeable energy storage device Cn at the common node 310.

The first and second rechargeable energy storage devices C1, C2 are members of a first rechargeable energy storage device pair, the second and third rechargeable energy storage devices C2, C3 are members of a second rechargeable energy storage device pair, the third and fourth rechargeable energy storage devices C3, C4 are members of a third rechargeable energy storage device pair, the fourth and fifth rechargeable energy storage devices C4, C5 are members of a fourth rechargeable energy storage device pair and the n and n−1 rechargeable energy storage devices Cn, Cn−1 are members of the n−1 rechargeable energy storage device pair. Thus, the second rechargeable energy storage device C3 is common or shared with the adjacent first and second rechargeable energy storage device pairs, the third rechargeable energy storage device C3 is common or shared with the adjacent second and third rechargeable energy storage device pairs, the fourth rechargeable energy storage device C4 is common or shared with the adjacent third and fourth rechargeable energy storage device pairs, and so on.

A voltage balancing system 220 is utilized to balance voltage of each unique rechargeable energy storage device pair. As shown in FIG. 3, a first voltage balancing system 220a is utilized to balance voltage of the first rechargeable energy storage device pair, a second voltage balancing system 220b is utilized to balance voltage of the second rechargeable energy storage device pair, a third voltage balancing system 220c is utilized to balance voltage of the third rechargeable energy storage device pair, a fourth voltage balancing system 220d is utilized to balance voltage of the fourth rechargeable energy storage device pair, and voltage balancing system 220n-1 is utilized to balance voltage of the last rechargeable energy storage device pair.

The voltage balancing systems 220a, 220b are similar to the voltage balancing system 220 described above with respect to FIG. 2. For example, the voltage divider 30 of the first voltage balancing system 220a divides a total voltage across the first and second rechargeable energy storage devices C1, C2 that are connected at the first common node 302 into a first reference voltage and a second reference voltage. The first circuit elements 40 of the first voltage balancing system 220a are configured to actively discharge the first rechargeable energy storage device C1 when a difference between a voltage at the first common node 302 and the first reference voltage is greater than a first predetermined voltage, and the second circuit elements 50 are configured to actively charge the first rechargeable energy storage device C1 when a difference between the second reference voltage and the voltage at the first common node and is greater than a second predetermined voltage.

Similarly, the voltage divider 30 of the second voltage balancing system 220b divides a total voltage across the second and third rechargeable energy storage devices C2, C3 that are connected at the second common node into a third reference voltage and a fourth reference voltage. Also, the first circuit elements 40 of the second voltage balancing system 220 are configured to actively discharge the second rechargeable energy storage device C2 when a difference between a voltage at the second common node 304 and the third reference voltage is greater than a third predetermined voltage, and the second circuit elements 50 are configured to actively charge the second rechargeable energy storage device C2 when a difference between the second reference voltage and the voltage at the second common node 304 and is greater than a fourth predetermined voltage. The voltage balancing systems 220c, 220d, . . . 220n, 220n-1 are also similar to the voltage balancing system 220 described above with respect to FIG. 2 and are therefore not described in further detail.

In the system 300 shown in FIG. 3, in order to disable each voltage balancing system 220a, 220b, 220c, 220d, . . . , 220n, 220n-1, the gates of the P-channel MOSFETs Q3 and Q4 of each of the third circuit elements 60 are connected together, and are pulled low by, for example, an external controller (not shown), to the voltage of the negative terminal of a power supply.

Optionally, the first voltage balancing system 220a may also include fifth circuit elements comprising a fifth P-channel MOSFET, a sixth P-channel MOSFET, a first pull down resistor, a first pull-up resistor, and a first gate resistor that are in electrical communication and configured to receive a control signal for enabling and disabling the first voltage balancing system 220a. The second voltage balancing system 220b may also include sixth circuit elements comprising a seventh P-channel MOSFET, an eighth P-channel MOSFET, a second pull down resistor, a second pull-up resistor, and a second gate resistor that are in electrical communication and configured to receive the control signal for enabling and disabling the second voltage balancing system. A controller may be electrically connected to a gate of the fifth P-channel MOSFET, a gate of the sixth P-channel MOSFET, a gate of the seventh P-channel MOSFET, a gate of the eighth P-channel MOSFET, and configured to pull the voltage at a gate of the fifth P-channel MOSFET and a gate of the sixth P-channel MOSFET to a voltage of a negative terminal of the first rechargeable storage device to disable the first and second circuit element, and pull the voltage at a gate of the seventh P-channel MOSFET and a gate of the eighth P-channel MOSFET to a voltage of a negative terminal of the second rechargeable storage device to disable the third and fourth circuit elements.

In the data storage industry, data is required to be protected at all times during normal operation and during power loss. Thus, when the main power is lost, backup power that was previously stored in the rechargeable energy storage devices may be used to transfer the data from the volatile memory to permanently store in a non-volatile memory until the main power is restored. The data is then transferred back to the volatile memory for normal operation.

The voltage balancing system of the present disclosure also improves the efficiency of power utilization by providing the capability of disabling the voltage balancing system during data backup. Thus, any extra amount of charge that was stored in the rechargeable storage devices during the charging cycle will be utilized instead of being wasted by the voltage balancing system if it is enabled during backup. This extra amount of charge reduces the charging time when the main power is restored.

Advantageously, the method and system of the present disclosure facilitates monitoring of the health of rechargeable energy storages devices connected in series to determine their useful operating life, which in turn, improves the quality of each rechargeable storage device. Furthermore, the voltage balancing system of the present disclosure reduces the balancing time across each pair of rechargeable energy devices that are connected in series, thereby minimizing or inhibiting the time that the rechargeable storage devices are overcharged and prolonging the operating life of each rechargeable energy storage device.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A system for balancing voltage of first and second rechargeable energy storage devices that are connected in series at a common node, the system comprising:

a voltage divider for dividing a total voltage across the first and second rechargeable energy storage devices into a first reference voltage and a second reference voltage;

first circuit elements comprising a first comparator, a first P-channel MOSFET, a first current limiting resistor, and a first network of resistors, the first circuit elements being in electrical communication and configured to actively discharge the first rechargeable energy storage device when a difference between a voltage at the common node and the first reference voltage is greater than a first predetermined voltage; and second circuit elements comprising a second comparator, a second P-channel MOSFET, a second current limiting resistor, and a second network of resistors, the second circuit elements being in electrical communication and configured to actively charge the first rechargeable energy storage device when a difference between the second reference voltage and the voltage at the common node is greater than a second predetermined voltage.

2. The system according to claim 1, further comprising: third circuit elements comprising a third P-channel MOSFET, a fourth P-channel MOSFET, a pull down resistor, a pull-up resistor, and a gate resistor, the third circuit elements being in electrical communication and configured to receive a control signal for enabling and disabling the first circuit elements and the second circuit elements.

3. The system according to claim 1, wherein the first network of resistors comprises a three-resistor voltage divider, a feedback resistor, and an isolation resistor, and wherein the three-resistor voltage divider, the feedback resistor, and the isolation resistor are in electrical communication and are configured to generate an upper bound hysteresis voltage when the first P-channel MOSFET turns on.

4. The system according to claim 3, wherein the first predetermined voltage is half the total voltage across the first and second rechargeable storage devices plus the upper bound hysteresis voltage.

5. The system according to claim 1, wherein the second resistor network comprises a pull up resistor, a feedback resistor, a pull down resistor, and an isolation resistor, and wherein the pull up resistor, the feedback resistor, the pull down resistor, and the isolation resistor are in electrical communication and are configured to generate a lower bound hysteresis voltage when the second P-channel MOSFET turns on.

6. The system according to claim 5, wherein the second predetermined voltage is half the total voltage across the first and second rechargeable storage devices minus the lower bound hysteresis voltage.

7. The system according to claim 1, wherein the first comparator comprises a first input for receiving the first reference voltage and a second input for receiving the voltage at the common node, and an open drain type output for driving a gate of the first P-channel MOSFET.

8. The system according to claim 7, wherein the first comparator is configured to turn on the first P-channel MOSFET to actively discharge the first rechargeable energy storage device when the voltage at the second input exceeds the voltage at the first input.

9. The system according to claim 1, wherein the second comparator comprises a first input for receiving the second reference voltage and a second input for receiving the voltage at the common node, and an open drain type output for driving a gate of the second P-channel MOSFET.

10. The system according to claim 9, wherein the second comparator is configured to turn on the second P-channel MOSFET to actively charge the first rechargeable energy storage device when the voltage at the second input is less than the first input.

11. The system of claim 1, wherein the first current limiting resistor has a resistance value that limits an amount of current drawn by the first P-channel MOSFET during discharging of the first rechargeable energy storage device to a maximum rated drain current of the first P-channel MOSFET.

12. The system of claim 1, wherein the second current limiting resistor has a resistance value that limits an amount of current drawn by the second P-channel MOSFET during charging of the first rechargeable energy storage device to a maximum rated drain current of second P-channel MOSFET.

13. The system of claim 1, wherein a drain current of the second P-channel MOSFET provides a charge rate that minimizes an amount of time the second rechargeable storage device is exposed on overvoltage.

14. The system of claim 2, further comprising a controller electrically connected to a gate of the third P-channel MOSFET and a gate of the fourth P-channel MOSFET and configured to pull the voltage at the gate of the third P-channel MOSFET and the gate of the fourth P-channel MOSFET to a voltage of a negative terminal of the first rechargeable storage device to disable the first and second circuit elements.

15. The system of claim 14, wherein the controller is configured to calculate the capacitance of each of the first and second rechargeable energy storage devices when the first and second circuit elements are disabled.

16. system for balancing voltage of a voltage source, the voltage source comprising a first rechargeable energy storage device, a second rechargeable energy storage device, and a third rechargeable energy storage device connected in series, the first rechargeable energy storage device connected to the second rechargeable energy storage device at a first common node and the second rechargeable energy storage device connected to the third rechargeable energy storage device at a second common node, the system comprising:

a first voltage balancing system for balancing voltage of the first and second rechargeable energy storage devices, the first voltage balancing system comprising:
a first voltage divider for dividing a total voltage across the first and second rechargeable energy storage devices that are connected at the first common node into a first reference voltage and a second reference voltage;

first circuit elements comprising a first comparator, a first P-channel MOSFET, a first current limiting resistor, and a first network of resistors, the first circuit elements being in electrical communication and configured to actively discharge the first rechargeable energy storage device when a difference between a voltage at the first common node and the first reference voltage is greater than a first predetermined voltage; and second circuit elements comprising a second comparator, a second P-channel MOSFET, a second current limiting resistor, and a second network of resistors, the second circuit elements being in electrical communication and configured to actively charge the first rechargeable energy storage device when a difference between the second reference voltage and the voltage at the first common node is greater than a second predetermined voltage;

a second voltage balancing system for balancing voltage of the second and third rechargeable energy storage devices, the second voltage balancing system comprising:

a second voltage divider for dividing a total voltage across the second and third rechargeable energy storage devices that are connected at the second common node into a third reference voltage and a fourth reference voltage;

third circuit elements comprising a third comparator, a third P-channel MOSFET, a third current limiting resistor, and a third network of resistors, the third circuit elements being in electrical communication and configured to actively discharge the second rechargeable energy storage device when a difference between a voltage at the second common node and the third reference voltage is greater than a third predetermined voltage; and fourth circuit elements comprising a fourth comparator, a fourth P-channel MOSFET, a fourth current limiting resistor, and a fourth network of resistors, the fourth circuit elements being in electrical communication and configured to actively charge the second rechargeable energy storage device when a difference between the fourth reference voltage and the voltage at the second common node is greater than a fourth predetermined voltage.

17. The system according to claim 16, wherein the first voltage balancing system further comprises:

fifth circuit elements comprising a fifth P-channel MOSFET, a sixth P-channel MOSFET, a first pull down resistor, a first pull-up resistor, and a first gate resistor, the fifth circuit elements being in electrical communication and configured to receive a control signal for enabling and disabling the first voltage balancing system.

18. The system according to claim 17, wherein the second voltage balancing system further comprises:

sixth circuit elements comprising a seventh P-channel MOSFET, an eighth P-channel MOSFET, a second pull down resistor, a second pull-up resistor, and a second gate resistor, the sixth circuit elements being in electrical communication and configured to receive the control signal for enabling and disabling the second voltage balancing system.

19. The system of claim 18, further comprising a controller electrically connected to a gate of the fifth P-channel MOSFET, a gate of the sixth P-channel MOSFET, a gate of the seventh P-channel MOSFET, a gate of the eighth P-channel MOSFET, and configured to:

pull the voltage at the gate of the fifth P-channel MOSFET and the gate of the sixth P-channel MOSFET to a voltage of a negative terminal of the first rechargeable energy storage device to disable the first and second circuit elements; and pull the voltage at the gate of the seventh P-channel MOSFET and the gate of the eighth P-channel MOSFET to a voltage of a negative terminal of the second rechargeable energy storage device to disable the third and fourth circuit elements.

20. A system for balancing voltage of a voltage source comprising a plurality n of series-connected rechargeable energy storage devices arranged in rechargeable energy storage device pairs such that each rechargeable energy storage device pair shares one rechargeable energy storage device with an adjacent rechargeable energy storage device pair, wherein n is a positive integer, the system comprising:

a plurality n−1 of voltage balancing systems, each voltage balancing system configured to balance a voltage of a unique rechargeable energy storage device pair, each voltage balancing system comprising:

a voltage divider for dividing a total voltage across the rechargeable energy storage devices of the unique rechargeable energy storage device pair into a first reference voltage and a second reference voltage;

first circuit elements comprising a first comparator, a first P-channel MOSFET, a first current limiting resistor, and a first network of resistors, the first circuit elements being in electrical communication and configured to actively discharge one of the rechargeable energy storage devices of the unique rechargeable energy storage device when a difference between a voltage at a common node between the rechargeable energy storage devices of the unique rechargeable energy storage device pair and the first reference voltage is greater than a first predetermined voltage; and second circuit elements comprising a second comparator, a second P-channel MOSFET, a second current limiting resistor, and a second network of resistors, the second circuit elements being in electrical communication and configured to actively charge the one of the rechargeable energy storage devices of the unique rechargeable energy storage device pair when a difference between the second reference voltage and the voltage at the common node is greater than a second predetermined voltage.

* * * * *